United States Patent [19] [11] Patent Number: 4,721,590
Trapp [45] Date of Patent: Jan. 26, 1988

[54] PRESSURE-DETERMINED BLOWDOWN PERIOD FOR EACH OF MULTIPLE, COMMONLY MANIFOLDED CURING PRESSES

[75] Inventor: Dennis L. Trapp, Akron, Ohio

[73] Assignee: The Uniroyal Goodrich Tire Company, Akron, Ohio

[21] Appl. No.: 888,896

[22] Filed: Jul. 24, 1986

[51] Int. Cl.$^4$ .................. B29C 35/04; B29C 35/00
[52] U.S. Cl. .................. 264/40.5; 264/40.1; 264/315; 425/29; 425/153
[58] Field of Search .................. 264/40.1, 40.5, 40.6, 264/315, 326; 425/29, 33, 36, 52, 139, 149, 150, 151, 153

[56] References Cited

U.S. PATENT DOCUMENTS

| | | | |
|---|---|---|---|
| 3,443,280 | 5/1969 | Hugger | 425/29 |
| 4,344,142 | 8/1982 | Diehr, II et al. | 264/40.1 |
| 4,422,987 | 12/1983 | Arimatsu | 264/40.6 |
| 4,490,325 | 12/1984 | Mattson et al. | 264/315 |

Primary Examiner—Jan H. Silbaugh
Assistant Examiner—Neil M. McCarthy
Attorney, Agent, or Firm—Harry F. Pepper, Jr.; Alfred D. Lobo

[57] ABSTRACT

A curing press for tires, commonly manifolded to other curing presses in a curing room, are operated with a minimum blowdown time which is variable from one cycle of each press to another cycle. A first signal is generated by a pressure transducer ("PT") in pressure communication with the bladder(s) of each curing press; this first signal is compared to a second signal corresponding to a target pressure, which second signal is stored in a programmable controller ("PC"). The PC controls operation of the press, and is used to provide a variable blowdown period; how quickly this target in the PC is reached, is a function of the pressure in a common blowdown manifold for plural presses. Instead of setting a mean blowdown period arrived at by trial and error over years of operation in a particular curing room, and relying on a mechanical safety pressure switch to override the opening of the press if the pressure is too high at the end of the mean period set, the press is opened reliably and reproducibly when the target pressure is matched by the pressure in the bladder. The mechanical pressure switch is nevertheless necessary. But the reliance on the mechanical pressure safety switch is reduced only to those instances when there is (i) a power failure which wipes out the instructions of the PC, so that whether the press will open at any preset pressure is not predictable; and (ii) a failure of any valve which results in leakage of steam or water into the bladder.

6 Claims, 3 Drawing Figures

PRESSURE-DETERMINED BLOWDOWN PERIOD FOR EACH OF MULTIPLE, COMMONLY MANIFOLDED CURING PRESSES

BACKGROUND OF THE INVENTION

This invention relates to shortening the period of time a tire spends in a curing press, and more particularly to the last portion of this period which is referred to as the blowdown period.

The simple fact that the cost of producing a tire can be reduced by reducing the period of time it takes to vulcanize ("cure")a tire has sensitized major tire manufacturers to the criticality of saving a fraction of a minute in the curing cycle. Over the years, the effort to minimize curing time without sacrificing quality, has been unremitting. This effort has included using higher curing temperatures, changes in rubber compounding, mechanical improvements in the curing presses, improvements in the valving, and switching from lower pressure steam to higher pressure steam. Details about such systems are referred to in U.S. Pat. Nos. 2,066,265; 3,489,833; 3,579,626; 4,027,543; 4,126,657; 4,371,843; and, 4,490,325.

Referring particularly to the last ('325) patent, there is disclosed a multistage curing process in which a hot water (second stage) cure is sandwiched between first and third stage steam cures. Blowdown of the steam from the third stage saves about half the time the blowdown requires if the hot water cure was the last stage. This is because it is quicker to blowdown steam than it is to blowdown steam and remnants of water. It is the saving of a few seconds of this 'quicker' time with which my invention is now concerned.

A typical cycle for a passenger tire is about 15 min. For economic reasons, it is desirable to shrink the period for vulcanizing the tire to the minimum. Saving 30 secs in the curing cycle of a passenger tire may add up, over a period of time, to a several million dollar advantage for the manufacturers, provided of course, this can be done without sacrificing the cured quality of the tire produced. To this end, the '325 patent sought to improve the efficiency of the latter portion of the curing cycle where the main curing occurs, as did the teaching of U.S. Pat. No. 3,579,626; and the invention of U.S. Pat. No. 3,489,833 sought to improve the efficiency of warming up the tire in the initial portion of the curing cycle. Other teachings have focussed one or both of the aforesaid portions of the curing cycle. None, to my knowledge, is devoted to reducing the blowdown time.

By "shaping" we refer to the initial inflation of the bladder to permit it to press against the inner surfaces of the tire uniformly and thus displace air between the bladder and the tire. Shaping may be done in several steps. For example, the pressures may be sequentially increased from 2 psig to 5 psig, then to 10 psig, and held for a different interval of time at each pressure level. The internal pressure during the curing step may likewise be "stepped" and held at each pressure level for a different interval of time.

Those skilled in the art of curing tires will recognize that a tire is fully cured to desired "cured specifications" when the blowdown portion of the curing cycle is commenced, though some additional curing will continue while the tire is being blowndown, and even after it is removed from the curing press. But such additional curing, or over-curing, is not part of the essential curing covered by or within the cured specifications. Over-curing is generally undesirable, though some over-curing at the outer portions of a tire is to be expected when adequate curing is provided at the point of least cure. Thus, it seemed desirable to shorten the blowdown period if only to minimize over-curing a tire.

The blowdown portion of the cycle is the time it takes to purge steam from the bladder in each mold cavity until the pressure is sufficiently low to open the mold. Depending on numerous factors, some of which are detailed hereinafter, this period is fixed by a timer for each press and is about 30 sec for a passenger tire. If, for some reason, the pressure in the bladder is not low enough, the press will not open because of a pressure safety switch which mechanically responds to pressure on a diaphragm. The safety switch is set for a pressure low enough so as not to injure an operator who happens to be close by when the press opens. Such pressure is in the range from about 3 psig to about 10 psig.

Each press is already equipped with a mechanical pressure safety switch, typically a diaphragm type. A similar mechanical pressure switch may be used to trigger the ring drop (for radial tires) when the pressure reaches a predetermined level, say 2 psig. Still another mechanical pressure switch, also of the diaphragm type, is used to warm up and pulse a newly installed bladder, or start up a cold press. With these mechanical pressure sensors and their inherent advantage in coping with a power failure, there is no reason to use an electronic pressure sensor. Moreover, since the blowdown sequence and all other curing operations in conventional presses are timer controlled, there is no reason to desire the installation of yet another pressure sensor, whether mechanical or not. Most of all, trying to monitor pressure sensitively enough to affect the blowdown period seemed unlikely to be rewarding.

Thus, trying to save a few seconds, in the range from 3 to 15 secs, in the already brief blowdown period seemed, at first, to be misdirected effort because it was directed to what already was the shortest portion of the curing cycle; and, because the instrumentation to control such a fine adjustment in cycle time would be too sophisticated and demanding for reliable operation in a curing room of a tire plant.

The curing room typically houses from 50 to about 250 curing presses which are fed by central steam and water systems through steam and water manifolds to which each press is connected with appropriate valving. Of particular concern to this invention is the blowdown manifold to which each press is connected. This manifold is typically a relatively large diameter steam line, in the range from 8" to 12" diam. depending upon the number of presses commonly manifolded; or, a relatively large diameter water blowback line, in the range from 10" to 14" diam. for presses in which hot water is recovered for reuse. Steam, used to displace the trapped hot water is later blowndown.

The steam blowdown lines from each press to the manifold are also relatively large, in the range from 1" to 2", considering that their function is simply to exhaust the steam trapped in the mold near the end of the curing cycle.

The blowback portion of the cycle is also referred to as the hot water recovery portion of the cycle when hot water is used in the cure.

Each press may include a single, but usually two, simultaneously operated molds and the press is preferably individually controlled by its own programmable controller ("PC") and the necessary instrumentation and hardware which allows a press to be operated automatically. The curing instructions for the PC may be downloaded from a central computer each time the curing cycle is to be changed.

A curing press may be of the 'pot-heater' type referred to in U.S. Pat. No. 4,371,483, in which a stack of split-molds loaded with green tires is formed within a pressure vessel closed at the top, with a dome having a butt-plate against which the stack is biased by a hydraulic platform on which the stack rests. Conventional potheaters are of the type manufactured by United McGill of Columbus, Ohio or Pennsylvania Engineering Corp. of Newcastle, Pa., inter alia.

Another curing press is made by McNeil Corp. under the Bag-O-Matic trademark. This press uses an inflatable elastomeric bladder which is raised and lowered on a central shaft axially disposed within a green tire in a mold cavity. Still another popular press is made by NRM Corp. under the Autoform trademark. This latter press is also referred to as the "bag-well" press because it uses a bag (bladder) in a central well, and a ram pushes the bag down before a cured tire is removed.

Regardless of the type of curing presses used in the curing room, each is manifolded to a common blowdown manifold; though each press in a present-day curing room is controlled by a PC, the blowdown period on prior art presses is fixed; that is, a timer is set which establishes when a blowdown period is completed. The length of the period is fixed from experience, and trial and error. Stated differently, it is experimentally established how long it takes for the pressure in the bladder to fall low enough so that the mold can be opened safely, and this period, with additions for expected variations in steam pressure, and for a margin of safety, is the period set on the timer.

The presses are loaded sequentially, so that an operator may successively load each of a plurality of presses as he proceeds down the line of presses in the curing room. However, not all the presses are operated on the same curing cycle, and even if they were, the staggered sequence of their operation may not be preserved from one operating shift to another. Variations in the open/close cycle are generally cumulative, and to be expected. For example, there may be a delay in stripping a cured tire, or the loader may pick up a tire incorrectly and the press must be stopped, or there is a bladder failure, or the operator may simply have run out of green tires for that press. As a result, the blowdowns of several presses may overlap. If these presses are in the same row, or are in different rows but in pressure-sensing relationship with one another through the common manifold, overlapping blowdowns will increase the pressure in the blowdown manifold, and the pressure differential between the bladder and the blowdown manifold will be smaller than when there is no overlap.

Other causes for a change in the pressure differential may be a leak of hot water, or steam, into the blowdown manifold, sufficient to increase the pressure therein; or, a restriction in a blowdown valve, or blowdown line, typically caused by a small piece of rubber, broken off from the bladder.

Since any of the foregoing reasons will cause a smaller pressure differential, therefore will require a longer blowdown than is set on the timer, it is probable that the timer (with a fixed period) on the PC will permit the press to open when the pressure in the bladder is too high. Therefore a safety pressure switch is provided on each press which will not permit it to open.

In most instances, under normal operating conditions, the press is blowndown well within the fixed time period. For example, if the time period set is 30 sec, the press is typically blowndown to less than 5 psig within 20–25 secs so that, in actual normal operation, the press could have opened 5–10 secs earlier.

Since a pressure safety switch is provided on each press, it seemed self-evident that this switch should be used to permit the press to open immediately upon the predetermined pressure having been reached, rather than have the press operate with a fixed blowddown period. For example, one could set the timer for an unrealistically short time, say 10 secs, relying solely on the pressure safety switch to allow the press to open when the presure is low enough. In other words, one would be using the pressure switch on each press to provide a variable blow-down time which would be the shortest interval for the particular conditions extant at the blowdown of that press. Except there would be no safety if the pressure safety switch malfunctioned - a problem easily solved by using two pressure safety switches. Except that pressure switches are electromechanical devices which are prone to drift, therefore require frequent calibration; and they are susceptible to damage from the curing media, and also to mechanical wear and aging. Maintaining a single pressure safety switch is an unenviable task, and adding a second such switch results in exponentially compounding the maintenance problem—which is not quite what plant operating personnel favor.

Since a temperature probe in the blowdown line would essentially instantaneously register the temperature of the steam, it appeared that the temperature corresponding to the desired steam (low) pressure, say 5 psig, could provide the signal to open the press. But a sufficiently sensitive temperature probe is not easily available.

Still another consideration was the use of an electronic strain gauge which was sensitive enough to distinguish the difference in strain between the halves of the mold when the pressure in the bladder was sufficiently low, but the sensitivity of such a gauge was problematical.

Thus it was that I decided to trigger opening of the press with pressure, but not to use a pressure switch, and somehow to generate a signal corresponding to the instantaneous pressure within the bladder, and use the signal to trigger the opening.

SUMMARY OF THE INVENTION

It has been discovered that a first signal generated by a pressure transducer ("PT") in pressure communication with the bladder of a curing press, but distally located relative to the press, may be compared to a second signal stored in a programmable controller ("PC") which controls operation of the press, and is used to provide a variable blowdown period; the second signal corresponds to a preset target pressure; how quickly this target in the PC is reached, is a function of the pressure in a common blowdown manifold for plural presses. At predetermined intervals of time each press is selectively in open and closed communication with the blowdown manifold, being closed during the shaping and curing stages when the bladder is under pressure, and open when it is to be evacuated.

Accordingly it is a general object of this invention to provide each of plural curing presses, commonly manifolded to a steam blowdown manifold in a curing room, with a PC on each press; the PC controls opening and closing of each press, providing predetermined fixed periods of time for each curing operation in the cycle, except for the blowdown period which is variable. The blowdown period at the end of each cycle is determined by matching a first signal corresponding to the pressure within the bladder, with the target pressure in the range from about 1 psig to about 5 psig, whereby the blowdown period is a function of the cumulative pressure differential between the bladder and the manifold pressure.

It is a specific object of this invention to provide an electronic pressure sensing means in combination with a PC to actuate opening of a curing press after blowdown as soon as the internal pressure within the bladder is low enough to do so; reliance on a PT obviates the drawbacks of a mechanical pressure sensing means; yet, the latter must be used as a safety switch, in addition to the pressure transducer, so that in the event of a power failure, the press will not open when the pressure within the bladder is high enough to be dangerous to the safety of the press operator.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the views and in which.

DETAILED DESCRIPTION OF PREFERRED EMBODIMENTS

This invention is particularly adapted for use in a curing room in which plural curing presses are commonly manifolded, that is, connected to a large diameter manifold into which each press is evacuated or "blown down". The following description is for curing presses in which the fluid to be blown down is steam, it being understood that blowndown fluid may also be hot or cold water under pressure.

In particular, the following detailed description refers to cutting the blowdown time in a three stage curing process more fully described in U.S. Pat. No. 4,490,325 in which the time required for blowdown has already been cut in half, compared with processes prior to the patented process. In the first stage (stage I) of such a three-stage process, steam at high pressure (250-300 psig) is supplied to the curing bladder for at least several minutes to effect rapid heat transfer through the bladder. In the second stage (stage II) hot water at high pressure (300-450 psig) is supplied to the bladder and maintained therein for a portion of the curing cycle while outflow from the bladder is cut off or "dead ended". The third stage (stage III) begins with expelling the water from the bladder with high presure steam (250-300 psig) and continues with heating steam supplied to the bladder for 25 to 60 percent of the pressure-curing period. The "pressure-curing period" as referred to herein begins with the introduction of high-pressure steam in stage I, and ends with relieving pressure in stage III. The term "high-pressure steam" refers to steam at pressure in the range from about 200 psig to about 350 psig.

Before the end of stage III, steam pressure is lowered to cool the inner surface of the bladder and to boil off residual water. The steam pressure and temperature is regulated to assure adequate curing at the point of least cure in the tire, typically a point 'a' in the tread shoulders (see FIG. 1). Point 'b' identifies a point near the crown of a tire, point 'c' one on its outer surface, and point 'd' one on the inner surface of the carcass. The precise time set for each stage is arrived at by trial and error for a particular rubber compound used in a specified tire size, so that the maximum permissible vulcanizing temperature at the point of least cure is not exceeded.

Figure 1:
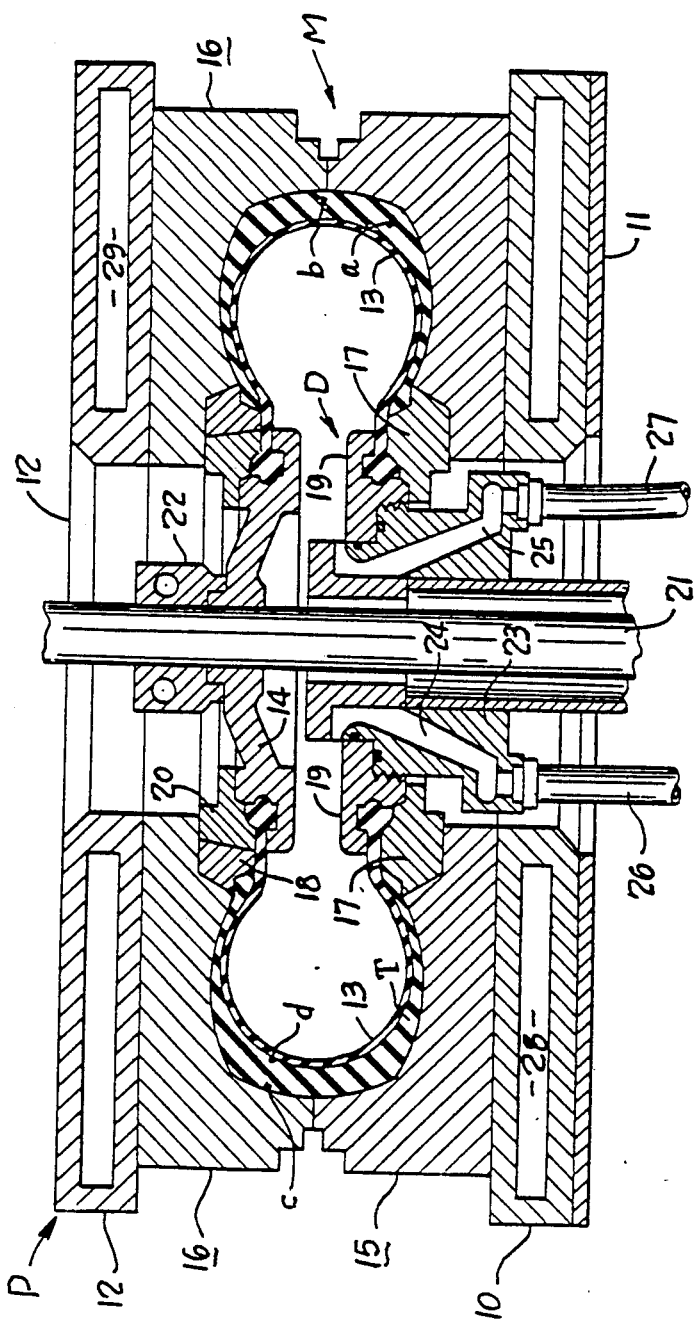
FIG. 1 is a partial vertical cross-sectional view on a reduced scale, showing the conventional type of equipment including a shaping and vulcanizing press and a tire mold.

Referring further to FIG. 1 there is shown a platen press P and a tire mold M during curing of a standard tire T. The drawing is schematic with parts omitted, and the mold and the press are not drawn to scale. The platen press P may be a standard type of "Bag-O-Matic" press substantially as shown and described, for example, in U.S. Pat. No. 2,808,618 and other patents of L. E. Soderquist.

As shown herein press P includes a fixed platen 10, a bed 11 and a platen 12 rigidly mounted on the movable upper portion of the press (not shown). As indicated in the last-named patent, conventional means are provided for raising, lowering and tilting the entire upper assembly. A conventional bladder mechanism D is provided at the center of the press having a curing bladder or diaphragm 13 as indicated in the aforesaid patent and in U.S. Pat. No. 2,775,789.

The upper and lower halves 15 and 16 of the tire mold M are rigidly connected to the platens 10 and 12. A multiplicity of vent passages (not shown) extend from the toroidal mold cavity to the exterior of the mold. The bladder mechanism D has lower and upper bead positioning rings 17 and 18 and a lower diaphragm clamping ring 19. Upper diaphragm clamping rings 14 and 20 fit within the bead ring 18. Clamping rings 14 and 20 are moved vertically by a piston rod 21 having an attaching collar 22. An annular support member 23 has a pair of passages 24 and 25 in communication with inlet and outlet conduits 26 and 27 to permit free flow of water and steam to and from the bladder 13. Each of said passages may have a cross section elongated in the circumferential direction.

The press P is heated by supplying steam to the annular chambers 28 and 29 of the lower and upper platens, and, if desired, the heating may be continuous to maintain a substantially constant temperature.

Figure 2:
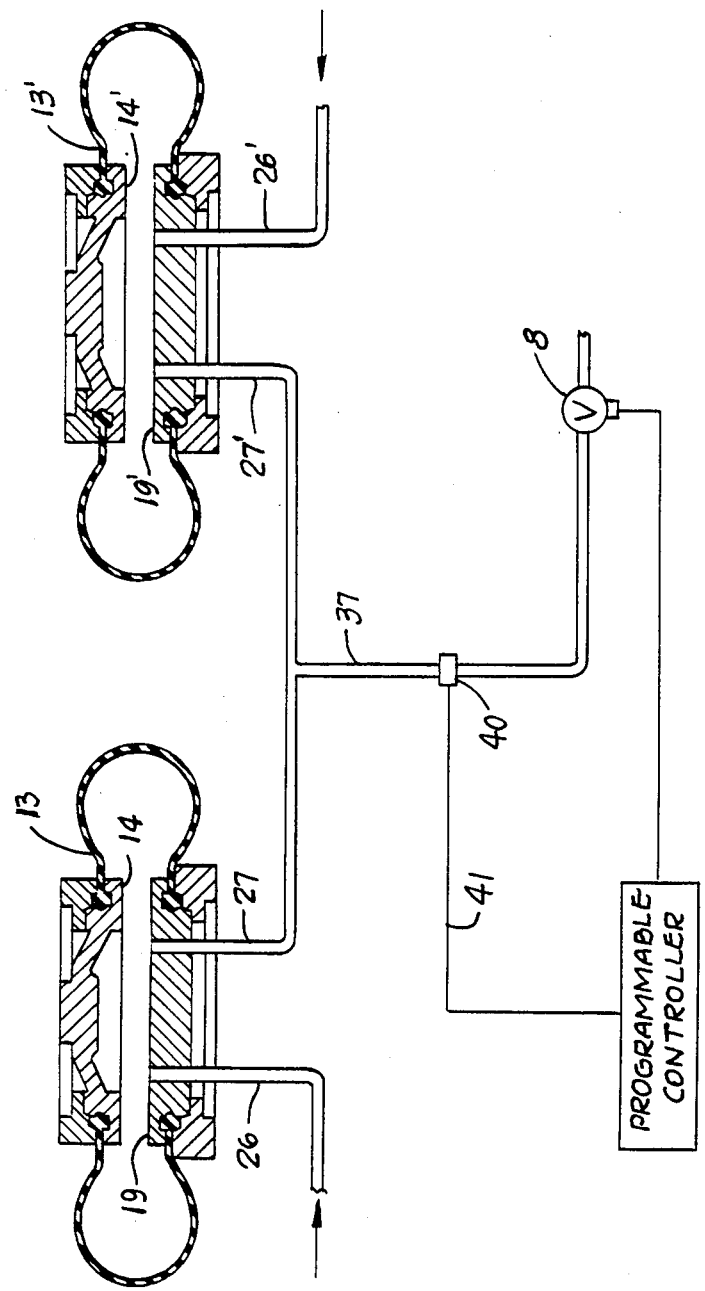
FIG. 2 is a schematic illustration of a pair of bladders in a dual-cavity curing press in which the bladders are connected to a common main blowdown manifold in parallel, as are the blowdown lines of other curing presses (not shown) in a curing room; and, FIG. 3 is a diagrammatic plan view showing the valves and piping for controlling flow of water and steam to and from the curing bladder of a typical press.

Referring now to FIG. 2, there is shown a typical two-cavity press in which two assemblies described hereinabove are installed to cure two tires at a time. The second mold M' in the two-cavity press has an analogous bladder 13' deployed within a tire T' placed in the upper mold half 15' around the center bladder mechanism D' and piston rod 21', and inlet and outlet ports connected to a platen-supply inlet and outlet lines, in a manner analogous to that described for the first mold.

Figure 3:
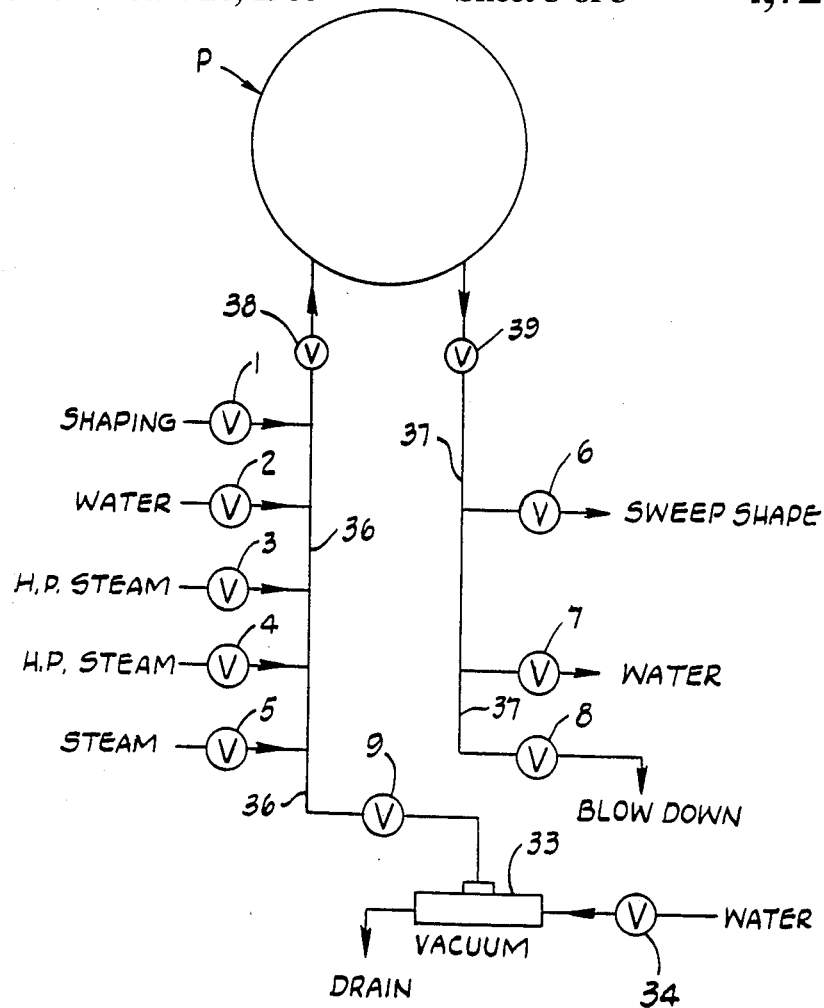

FIG. 3 indicates diagrammatically the type of piping arrangement which may be employed with each press used in the practice of this invention. With a multiplicity of presses in a curing room, a more sophisticated system is used. Typically, plural inlet manifolds are provided which selectively supply both hot water and/or steam at predetermined pressures and temperatures in a predetermined sequence of operations, each with a specific, fixed period of time for shaping and curing the tire under process conditions adequate for the purpose, all of which is conventional and of no particular concern in the blowdown of a press, the shortening of which blowdown period is the goal and focus of this invention.

The press and related apparatus of FIG. 3 includes valves 2 through 9 and other valves for controlling flow of water and steam to and from the curing bladder of the press P through inlet and outlet conduits 36 and 37. Valves 38 and 39 in the latter conduits are normally open and can be closed to stop such flow when the press P is out of service.

The valve 1 controls the flow of shaping steam designated "shaping"; valve 2 controls the flow of high-pressure heated water designated "water"; valves 3 and 4 control high pressure steam designated "H.P.Steam", and valve 5 controls the flow of low pressure steam designated "L.P.Steam". Valves 6 to 8 control flow from the outlet conduit 37, and valve 9 controls flow from the inlet conduit 36 to the vacuum pump 33. The latter is a venturitype pump receiving water through cut-off valve 34 and conduit 35.

To cure a tire, the inlet conduit at 2 may be supplied with heated water at high pressure in the range from about 300 psig to 400 psig, and the inlet conduits at 3 and 4 may be provided with saturated steam at a pressure in the range from about 240 psig to 300 psig. Additional inlet conduits, such as the conduit at valve 5, may be supplied with steam at lower pressure in the range from about 100 psig to about 150 psig.

In a particular sequence of curing steps, all the valves 1 through 7 and 9 are initially closed (at the beginning of a cycle). After the green tire is positioned on the lower mold half 15, the valve 8 is closed and the valve 1 is opened to admit shaping steam to the bladder 13 at a pressure in the range from about 5 psig to about 10 psig until the tire approaches its full size. The press then closes and locks in the closed position (FIG. 1). The valve 3 is then opened to admit the steam (i.e. at 250 psig, say) to the inlet conduit 36 while outlet 37 is obstructed or cut off. This is the first steam heating stage. If desired valve 4 may be opened instead to provide steam at 300 psig. At the end of stage I, the valves 3 and 4 are closed and valve 2 is opened to admit hot water under pressure in stage II while the outlet 37 is cut off (dead ended). This fills the bladder with water while maintaining the high internal pressure.

At the end of stage II, the valve 3 is opened to admit high pressure steam and valve 7 is opened simultaneously so that the water is expelled from the bladder in a short blowback (not to be confused with "blowdown") period of 1 or 2 min depending on the tire size. Valve 7 is then closed to dead end the steam for the remainder of stage III. One-way check valves (not shown) may be employed in the inlet lines at 1, 2, 3 and 4 to prevent unwanted reverse flow. Before the end of stage III, valves 3 and 4 are closed and optional valve 5 may be opened to admit steam to the bladder at a reduced pressure in the range from 100 psig to about 150 psig. This cools the inner surface of the hot bladder and permits the residual water in the bladder to boil off.

The sequence of operations is controlled by a sequence control means in the form of a programmable controller ("PC") which includes means for storing and executing a sequence of instructions which determine the intervals of time for shaping the tire, and then curing it with curing fluid at a high enough temperature and pressure to effect the cure in a predetermined period of time.

The PC also includes means for comparing the first signal with a second signal corresponding to a preselected low pressure within the range from about 1 psig to about 10 psig, more preferably in the range from 1 psig to 5 psig; and, means to actuate the separation of the mold halves when the first and second signals are matched.

Such a PC is commercially available, typified by an Allen Bradley Model 2/30. Multiple set points may be set, so that the period determined by the setting of each set point is variable. The instructions determine the intervals of time for each operation through the operation of valve events which are controlled by the PC, as are the sequence of pressure events within the bladder.

The pressure within the bladder is sensed by connecting the PT through sensing line 41 (FIG. 2) in open communication with outlet conduits 27 and 27'. Line 41 is typically from about 0.25" to 0.5" in diameter and the sensor and PC are mounted on a panel adjacent the press. If the target pressure set in the PC of a first press is 2 psig (say), and the pressure in the blowdown manifold is atmospheric, the blowdown period will approximate the minimum, say about 20 sec. If one or more, second and third presses with their blowdown lines in pressure communication with the first press are being blowndown during the same period as the first press, the blowdown period for each press will be longer than the minimum because the pressure differential between the bladder and the blowdown manifold is less. The PT on each press senses the internal pressure of each bladder as it is affected by the cumulative effect of the presses with overlapping blowndown periods.

Operation of the press is commenced when loading (a radial passenger green tire) is initiated to activate press operation. The tire loader carries the green tire into the press and holds it in a centered position over the bladder assembly with the bottom bead just above the bead ring in the lower mold half. Preform shaping steam enters the blader immediately after loading the press with the green tire. Ring drop occurs after the initial shaping pressure (first shaping pressure) in each bladder has reached approximately 2 psi and is activated by a pressure switch set at 2 psi. The pressure switch also activates a timer which times out the chuck release before the loader exits. The timer is set for 4 to 6 seconds, depending upon the speed of the center mechanism. When the loader exits, the press closes.

A second shaping pressure which is higher than the first, is activated about 30 ins before the press closes. A third shaping pressure which is higher than the second is activated about 10 ins before the press closes. The precise level of shaping pressures for the second and third steps will depend upon the tire and bladder combination, but the third stage pressure is always less than about 20 psig. Typically the second shaping pressure is 12 psig and the third is 15 psig. The preform shaping steam pressure is on sweep shape through valve 6 and continues to approximately 4 ins from press close, at which time valve 6 is closed (blocked off).

The interval of time during which shaping fluid is held in the bladder to shape the tire, is programmed into, and thus fixed in the PC. Routinely, the shaping is effected in three stages.

The pressure in the bladder is sensed by the PT distally located relative to the mold halves but in pressure sensing communication with the interior of the bladder so as to generate a first signal correlatable with an instantaneous pressure within the bladder. The particular type of electronic pressure-monitoring device used for the PT is not narrowly critical. The PT used may be any one of the following types: reluctive, capacitive, potentiometer, linear variable differential transmitter, force balance, piezoelectric, or resonant wire types. Even strain gauge types may be used, but are not preferred. Most preferred is the capacitive or piezoelectric types which can operate at elevated temperatures in the range from about 100°–250° F.

Blowdown is initiated by closing valve 5 and opening valve 8 to relieve pressure in the bladder and to vent the bladder to the blowdown manifold which is nominally expected to be at atmospheric pressure. As is shown in FIG. 2, the end of the sensing line of the PT 40 is inserted in the drain line 37, into which drain outlet conduits 27 and 27' of the two molds. For curing in a typical Bag-O-Matic press, two set points are set. A first set point on the PC is set at a pressure in the range from about 20–50 psig, preferably 30 psig (say). The time it takes to reach this first pressure set point will depend upon the pressure difference between the pressure in the bladder and that in the blowdown manifold. When this pressure is reached during the natural blowdown period, the valve 8 is closed and valves 9 and 34 are opened to apply a vacuum to conduit 36, thus accelerating loss of pressure in the bladder. The second set point is set in the range from about 1–10 psig, more preferably 2 psig (say). Again, the time it takes to reach this second pressure set point will depend upon the pressure difference between the pressure in the bladder and that in the blowdown manifold. When the pressure reaches the second set point, an instruction from the PC actuates opening of the mold.

In an Autoform press (not shown), a first pressure setpoint may be set in the range from 10–30 psig, preferably 20 psig (say). When this pressure is reached after blowdown is commenced, the well vents which are diaphragm valves (one for each well) are opened to atmosphere. The pressure continues to drop until the second pressure set point is reached, in the range from 1–10 psig, preferably 2 psig (say). When this second pressure is reached, the PC signals the molds to open.

From the foregoing description it will now be evident that use of a PT on each curing press, in conjunction with a PC precisely and factually copes with the myriad multiplicative coincidences which affect the blowdown periods of each bladder in the 'real life' operation of a multiplicity of commonly manifolded curing presses in a curing room. Instead of setting a mean blowdown period arrived at by trial and error over years of operation in a particular curing room, and relying on a mechanical safety pressure switch to override the opening of the press if the pressure is too high at the end of the mean period set, the press is opened reliably and reproducibly when the target pressure is matched by the pressure in the bladder. The reliance on the mechanical pressure safety switch is thus reduced only to those instances when there is (i) a power failure which wipes out the instructions of the PC, and whether the press will open at any preset pressure is not predictable; and (ii) a failure of any valve which results in leakage of steam or water into the bladder.

I claim:

1. In a curing room containing plural curing presses for tires, each of which presses is provided with an elastomeric curing bladder deployed within separable upper and lower mold halves, and a blowdown conduit through which a blowdown fluid is to be blown down from within said curing bladder, near the end of a curing cycle, into a common manifold which places two or more bladders in pressure-sensing, relationship with each other during a portion of the blowdown period, the improvement comprising, pressure transducer means distally located relative to said halves but in pressure sensing communication with the interior of said bladder so as to generate a first signal correlatable with an instantaneous pressure within said bladder during the blowdown period;

programmable controller means including
   (i) means for storing and executing a sequence of instructions determinative of fixed intervals of time for shaping said tire and thereafter curing it with a curing fluid at adequate temperature and sufficient pressure for the purpose;
   (ii) means for comparing said first signal generated during the blowdown period with a second signal corresponding to a preselected low pressure within the range from about 1 to about 10 psig; and,
   (iii) means to actuate the separation of said halves when said first and second signals are matched; and, mechanical pressure safety switch means in pressure sensing relationship with the interior of said bladder preset for a preselected pressure at which the press may be safely opened;

whereby the blowdown time for each said press is variable from one curing cycle to another, depending upon the difference in pressure between said interior of the bladder and the common manifold, but said mold halves are separable at the end of a blowdown cycle soon after said first and second signals are matched.

2. The apparatus of claim 1 wherein said first signal generated during the blowdown period corresponds to an instantaneous pressure within the bladder in the range from about 1 psig to about 5 psig.

3. The apparatus of claim 2 wherein said pressure transducer includes a pressure sensor chosen from a capacitive type and a piezoelectric type.

4. In a process for shaping and curing a tire including storing and executing with programmable controller means a sequence of instructions determinative of fixed intervals of time for shaping said tire and thereafter curing said tire with a curing fluid at adequate temperature and pressure, said process including blowing down a curing fluid near the end of said curing cycle from within a bladder used to cure said tire disposed between mold halves in a curing press equipped with a mechanical pressure safety switch to prevent the press from opening when the pressure of curing fluid in said bladder is greater than 10 psig, the improvement comprising, electronically sensing the instantaneous pressure within the bladder during said blowdown at a location distally located relative to said mold halves so as to generate a first signal correlatable with said instantaneous pressure; setting a preselectable press-opening pressure within the range from about 1 to about 10 psig and generating a second signal corresponding thereto in said programmable controller means; comparing said first signal with said second signal; and, actuating separation of said halves with said programmable controller means when said first and second signals are matched.

5. The process of claim 4 wherein said first signal corresponds to an instantaneous pressure within the bladder in the range from about 1 psig to about 5 psig.

6. The process of claim 5 wherein said pressure transducer includes a pressure sensor chosen from a capacitive type and a piezoelectric type.

* * * * *

UNITED STATES PATENT AND TRADEMARK OFFICE
CERTIFICATE OF CORRECTION

PATENT NO. : 4,721,590

DATED : January 26, 1988

INVENTOR(S) : Dennis L. Trapp

It is certified that error appears in the above-identified patent and that said Letters Patent is hereby corrected as shown below:

Column 10, Line 15, delete the ",".

Signed and Sealed this

Twentieth Day of February, 1990

Attest:

JEFFREY M. SAMUELS

Attesting Officer     Acting Commissioner of Patents and Trademarks